Sept. 15, 1925.

S. BOROS 1,554,066

JAR ATTACHMENT

Filed Jan. 19, 1925

S. Boros
INVENTOR
BY Victor J. Evans
ATTORNEY

WITNESS:

Patented Sept. 15, 1925.

1,554,066

UNITED STATES PATENT OFFICE.

STEVE BOROS, OF KENMORE, OHIO.

JAR ATTACHMENT.

Application filed January 19, 1925. Serial No. 3,523.

*To all whom it may concern:*

Be it known that I, STEVE BOROS, a citizen of the Republic of Hungary, residing at Kenmore, in the county of Summit and State of Ohio, have invented new and useful Improvements in Jar Attachments, of which the following is a specification.

My invention relates to jars or other receptacle attachments and its principal object is to provide a device to be associated with a jar or receptacle which will hold fruit or other objects in the liquid contained in the receptacle so that such objects will be retained in a state of preservation indefinitely.

A further object is to provide a device to be used in canning fruit and the like which includes a spring held follower for pressing the fruit or other objects down into the receptacle and maintaining the same submerged in their juices.

The invention also contemplates a jar attachment comprising a band or annulus arranged in the mouth of the bottle and a spring urged follower which contacts with the fruit or other objects contained in the receptacle.

With the preceding and other objects and advantages in mind, the invention consists in the novel combination of elements, construction and arrangements of parts and operations to be hereinafter specifically referred to, claimed and illustrated in the accompanying drawings, in which:

In the drawings:—

Figure 1:
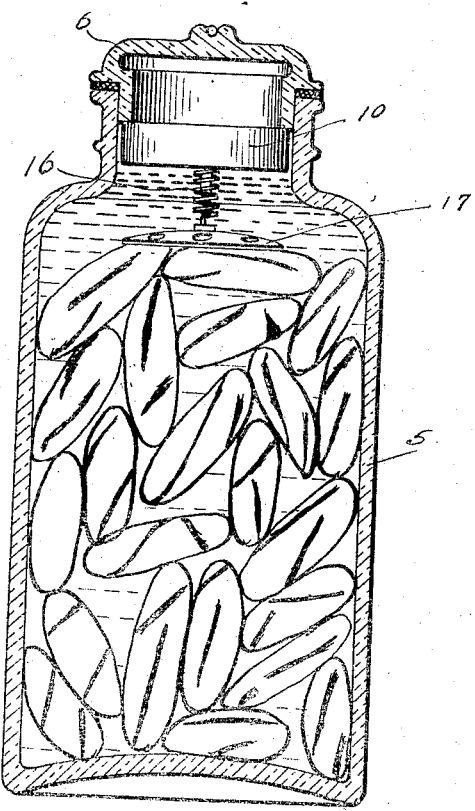
Figure 1 is a vertical sectional view of a bottle or jar equipped with the present invention.
Figure 2:
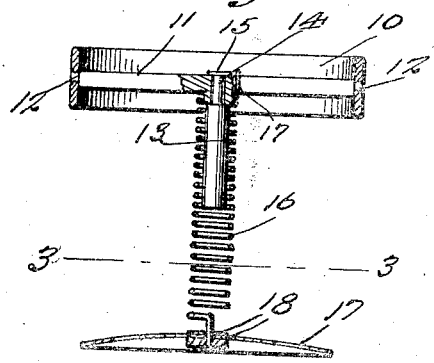
Figure 2 is a vertical sectional view of the device.
Figure 3:
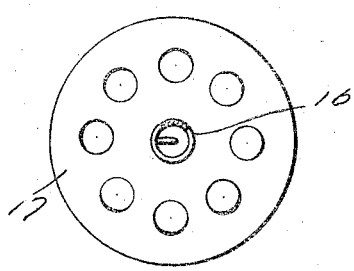
Figure 3 is a horizontal sectional view taken on line 3—3 of Figure 2.

Referring to the drawings in detail wherein corresponding characters of reference denote corresponding parts throughout the several views, the numeral 5 designates a conventional canning jar having a removable top 6. The jar per se forms no part of the present invention, but is merely shown for the purpose of illustrating the application of the invention.

My invention comprises the annular rim 10 to be received in the jar neck and engaged at the lower edge of the closure 6. A bar 11 extends transversely across the rim 10 and has its ends riveted to the rim as indicated at 12. Extending downwardly from the bar 11 is a stem 13 and this stem is connected to the bar 11 by reducing its ends as at 14 and riveting the end thereof as at 15. Encircling the stem 13 is a coil spring 16 having one end passed around the bar 11 as indicated at 17. This spring 16 extends an appreciable distance below the lower end of the stem and has its lowermost convolution extended at right angles and connected with a concavo convex perforated disk. Washers 18 are disposed upon the opposite faces of the concavo convex disk 17 and are secured upon the angular disposed end of the spring 16. When in use, the device is arranged in the jar as shown and resiliently held in position as shown. That is the expansible spring 16 urges the perforated disk 17 into contact with the articles within the jar and holds the same submerged in their liquid.

While I have shown and described the preferred embodiment of the invention, I desire to have it understood that such changes may be made in the form, construction and arrangement of parts and operations, as will not depart from the spirit of the invention or the scope of the subjoined claim.

What is claimed is:—

A device of the character described comprising an annular rim to be arranged in the neck of a jar and engaged by the lid thereof, a member extending transversely across the rim and secured thereto, a stem depending from the member, a coil spring encircling the stem and having one end secured to the member and a concavo-convex perforated disk attached to the lower end of the spring and adapted to be resiliently held against the objects contained in the jar.

In testimony whereof I affix my signature.

STEVE BOROS.